US011290030B2

(12) United States Patent
Kortschack et al.

(10) Patent No.: US 11,290,030 B2
(45) Date of Patent: Mar. 29, 2022

(54) DRIVE DEVICE AND METHOD FOR LINEAR OR ROTARY POSITIONING

(71) Applicant: Picofine GmbH, Oldenburg (DE)

(72) Inventors: Axel Kortschack, Oldenburg (DE); Eike Oliver Schäfer-Nolte, Bremen (DE)

(73) Assignee: Picofine GmbH, Oldenburg (DE)

( * ) Notice: Subject to any disclaimer, the term of this patent is extended or adjusted under 35 U.S.C. 154(b) by 91 days.

(21) Appl. No.: 16/899,079

(22) Filed: Jun. 11, 2020

(65) Prior Publication Data
US 2020/0395871 A1 Dec. 17, 2020

(30) Foreign Application Priority Data
Jun. 11, 2019 (DE) .................. 102019115790.0

(51) Int. Cl.
*H02N 2/02* (2006.01)
*H02N 2/00* (2006.01)
*H02N 2/06* (2006.01)
*H02N 2/14* (2006.01)

(52) U.S. Cl.
CPC .......... *H02N 2/025* (2013.01); *H02N 2/0095* (2013.01); *H02N 2/062* (2013.01); *H02N 2/142* (2013.01)

(58) Field of Classification Search
CPC ...... H02N 2/025; H02N 2/0095; H02N 2/062; H02N 2/142; H02N 2/04; H02N 2/101
See application file for complete search history.

(56) References Cited

U.S. PATENT DOCUMENTS

| 6,188,161 B1 | 2/2001 | Yoshida et al. |
| 9,692,323 B2 * | 6/2017 | Kortschack .......... H02N 2/0075 |
| 9,722,512 B2 | 8/2017 | Rass et al. |
| 2003/0015940 A1 | 1/2003 | Hata |

FOREIGN PATENT DOCUMENTS

| CN | 106998156 B | 5/2019 |
| DE | 102015201754 A1 | 8/2016 |
| DE | 102016213596 B4 | 2/2019 |
| EP | 2678935 B1 | 4/2014 |
| WO | 2012/123251 A1 | 9/2012 |

* cited by examiner

*Primary Examiner* — Emily P Pham
(74) *Attorney, Agent, or Firm* — Seed Intellectual Property Law Group LLP (57) ABSTRACT

The disclosure relates to a drive means for non-resonant linear and/or rotary positioning of an object, comprising at least two piezoelectric or electrostrictive actuator groups, where-in a first actuator group moves a first runner portion relative to a stationary base of the drive means according to the principle of an inertia drive, and by means of the second actuator group a second runner portion is moved relative to the first runner portion with a limited range of movement in the high-resolution scan mode, wherein a common electrical control signal is applied to the first and second actuator groups.

22 Claims, 11 Drawing Sheets

DRIVE DEVICE AND METHOD FOR LINEAR OR ROTARY POSITIONING

BACKGROUND

Technical Field

The present disclosure relates to the field of linear or rotary positioning devices and corresponding positioning methods.

Description of the Related Art

Providing inertia drives, for example piezoelectric and electrostrictive stick-slip drives, with electrical signals (control pulse trains) having a flat and a steep edge in the manner of a sawtooth voltage waveform is known from the prior art. When the flat signal edge is applied to an actuator of such a stick-slip drive, the friction member fixed to the actuator entrains the runner. This phase is referred to as the stick phase. When the steep edge is active, slip occurs between the friction member and the runner. This phase is referred to as the slip phase. On the next flat edge of the pulse train, the friction member is again made capable of entraining the runner. It is known from EP 2 678 935 B1 that the waveform may differ in shape from a sawtooth waveform.

It has been shown that forced slip between the friction member and the runner is never fully achieved. This means that the runner is always prevented from moving in the planned manner. This happens in particular when the desired speed of the runner is slowed down during the slip phase, or when the runner is even carried along a bit in the direction of movement of the friction member. This is referred to in this context as "backlash". The extent of this influence is dependent, inter alia, on the force of the actuator, the acceleration of the friction surface, the speed of the runner at the beginning of the slip phase, the mass of the runner, on elasticities in the material and on external forces.

This influence on the runner during the slip phase is very disruptive, for example because it does not allow any genuinely uniform movement, but results in the runner moving with alternating speed. This disruptive influence also limits how small the signals applied to the actuator can become, because at very low amplitudes of the sawtooth signal, the backward movement on the steep edge may even be much greater than the resultant, remaining step. The consequence is that a reduction in step size leads to an increase in undesired vibrations of the drive, as the vibration amplitude in the case of small step sizes is no longer dominated by the step size itself, but by the amplitude of the backlash. Due to these increasing vibrations, therefore, it is inexpedient to select increasingly small steps when approaching an object.

In addition to the variations due to the backlash, as described above, the components of the inertia drive also experience vibrations that are differentiated into microvibrations and macrovibrations.

In the case of microvibrations, the steep edge is briefly followed by what can even be multiple transitions between static friction and sliding friction, with a frequency that is close to the natural frequency of the piezo driver.

As soon as there is persistent static friction, the transition from microvibration to macrovibration occurs, where the driver oscillates in common with the object to be positioned, with a natural frequency of the combination of at least the driver and the object.

Variations in speed, microvibrations and macrovibrations are disruptive for high-precision positioning.

In order to position locally with particularly high precision, the actuator is slowly deformed during the stick phase by applying a gradually changing voltage, and the runner is thus moved in a correspondingly precise and vibration-free manner. This mode is often referred to as the fine positioning mode or the scan mode. The runner can be positioned with a very high resolution, in the order of magnitude of the actuator resolution (often significantly smaller than one nanometer, sometimes even smaller than a picometer). However, the working range or scanning range in this mode is generally limited to a few microns. Due to the small working range in scan mode, the vibrations described above can still be disruptive, especially when the vibrations and the step size are of a similar order of magnitude. If, for example, the cantilever of a scanning force microscope approaches a surface with its tip, the tip must be brought so close to the surface in step mode that the scanning range is sufficient to reach the surface with the tip. If the step sizes are now chosen so small that they are in the order of magnitude of the scanning range, then there is a very high risk that the tip will hit the surface due to the steps and does not reach the surface in a controlled manner by means of the scan mode.

According to the prior art, an attempt is made in such cases to reduce the vibrations to a minimum using technologies that are described in patent specifications EP 2 678 935 B1 and DE 10 2016 213 596 B4. If vibrations still remain, or if the aforementioned techniques for reducing vibrations cannot be used, an attempt is made to increase the scanning range, for example by designing the actuator larger so that it has a longer stroke. This has the disadvantage that the actuator then has more mass and in the case of a piezoelectric or electrostrictive actuator has a correspondingly larger capacity, with the result that the actuator becomes more difficult to drive and often causes even greater vibrations of the drive. An alternative approach is to increase the stroke of the actuator by means of levers. However, this in turn leads to greater elasticity and to increased vibrations in the lever structure, which are then transmitted to the runner, with the consequence that relatively substantial measures must be undertaken to achieve low-vibration positioning.

BRIEF SUMMARY

One or more embodiments may eliminate or at least mitigate the disadvantages and problems associated with prior art stick-slip drives.

According to a first aspect of the disclosure, a drive means for non-resonant linear and/or rotary positioning of an object is proposed, the drive means comprising a base, a first piezoelectric or electrostrictive actuator group having at least one at least one actuator, a second piezoelectric or electrostrictive actuator group having at least one actuator, a runner having a first portion and a second portion which are designed to be movable toward one another in one direction of movement at least, wherein the second portion of the runner is the object to be positioned or is coupled to the object to be positioned, and a control means for the actuator groups, wherein the first actuator group is designed for a movement of the first portion of the runner relative to the base, wherein the second actuator group is designed for a movement of the second portion relative to the first portion of the runner along the direction of movement, wherein one of the actuator groups is designed for a movement in the manner of an inertia drive and the other one of the actuator groups is designed for direct or indirect coupling, wherein the control means is designed for generating a common electrical control signal for the actuator groups, said signal having at least one inertia drive signal portion comprising sections with different gradients and a semi-static scan signal portion, or the control signal connection is a common control signal connection for the actuator groups and is designed to receive the common electrical control signal for the actuator groups.

As an alternative to the control means, the drive means may be provided with a control signal connection for the actuator groups, which is designed to receive the common control signal for the actuator groups from a control means (which is not itself part of the drive means).

According to a second aspect of the disclosure, a method of non-resonant linear and/or rotary positioning of an object is proposed, comprising the steps of providing a base, a first piezoelectric or electrostrictive actuator group having at least one actuator, a second piezoelectric or electrostrictive actuator group having at least one actuator, and a runner having a first portion and a second portion which are designed to be movable toward one another in one direction of movement at least, wherein the second portion of the runner is the object to be positioned or is coupled to the object to be positioned, moving the first portion of the runner relative to the base by means of the first actuator group and moving the second portion relative to the first portion of the runner along the direction of movement by means of the second actuator group, wherein the one movement is performed in the manner of an inertia drive and the other movement is performed via a direct or indirect coupling, wherein the method includes providing a common electrical control signal for the actuator groups, said signal having at least one inertia drive signal portion comprising sections with different gradients and a semi-static scan signal portion.

One advantage of providing a common control signal is the lower cost for the control electronics, as it is not necessary to generate two control signals for each positioner. Furthermore, for example in applications in a vacuum chamber, fewer cables have to be routed through the chamber wall, and generally there are also fewer cables or lines to be handled, which is advantageous for complex positioning systems, in particular. Providing as few cables as possible is also advantageous for miniaturization, as few cables have to be routed in each positioner.

If one of the actuator groups is a piezoelectric actuator group, it is not necessary that the other actuator group is also a piezoelectric actuator group, and this also applies conversely, meaning it is not necessary for both actuator groups to be electrostrictive actuator groups. It is possible, in other words, to provide one actuator group as a piezoelectric actuator group and the other actuator group as an electrostrictive actuator group, and the same applies if more than two actuator groups are used.

The disclosure can be used for linear and rotary inertia or multi-actuator drive devices. Drive devices with more than one degree of freedom are also possible.

The aim may be to move either the runner as such, or the second portion of the runner, or to entrain another object by positioning the second portion of the runner (in which case the movement or positioning of the second portion of the runner is then a means for moving or positioning the other object).

Figure 1:
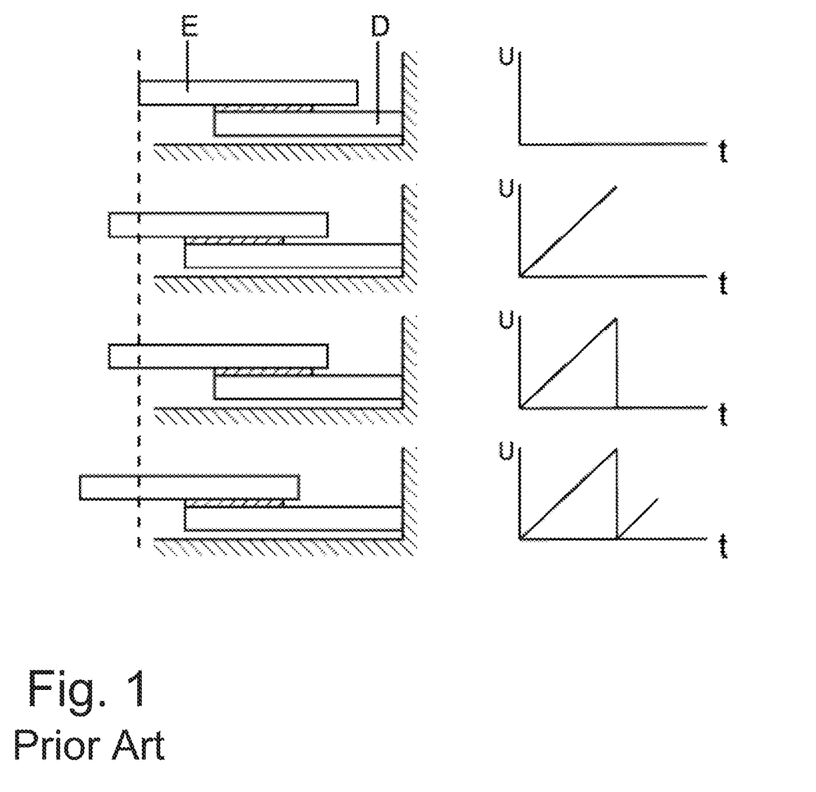
FIG. 1 shows a schematic sketch of a prior art inertia drive with typical sawtooth control.
Figure 3:
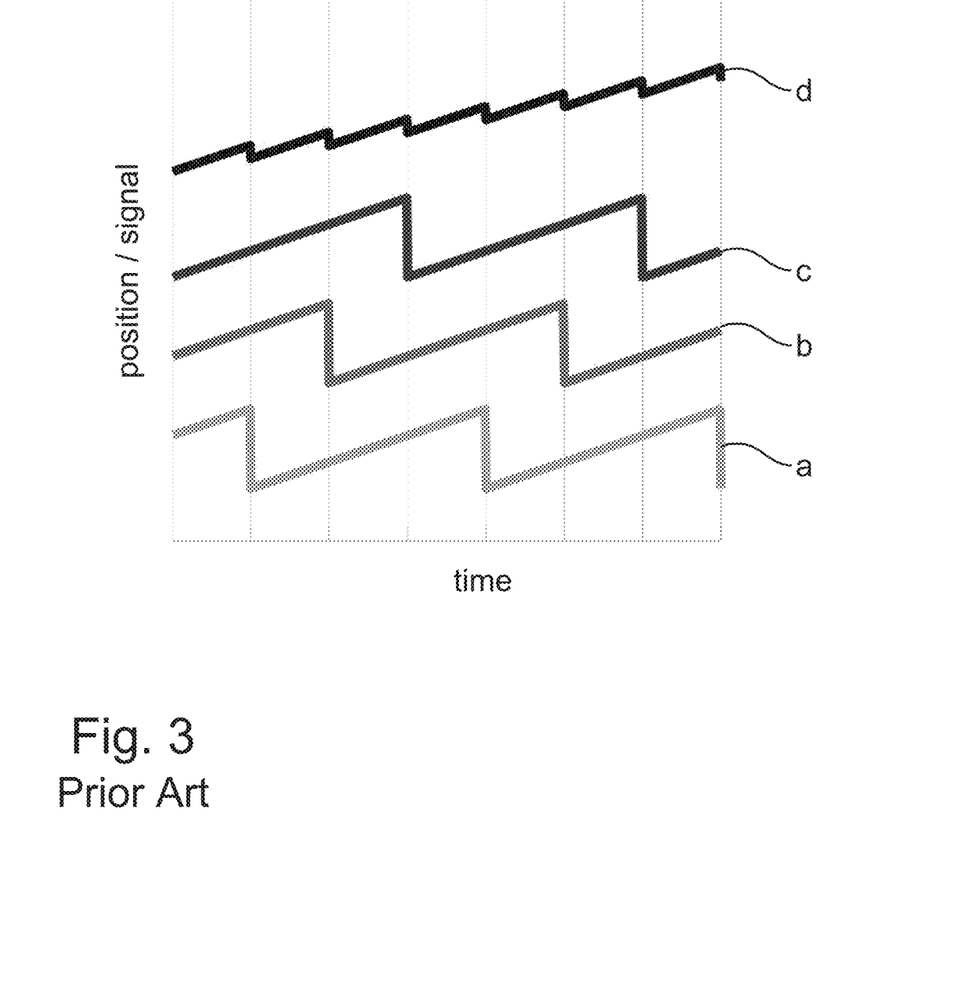
FIG. 3 shows a schematic view of control signals for a prior art multi-actuator drive and the resulting movement.

The inertia drive signal portion comprising sections with different gradients can be provided in the form of a sawtooth waveform as shown in FIG. 1 or FIG. 3. However, waveform shapes differing from such a shape, such as those known from EP 2 678 935 B1, for example, may also be used within the scope of the disclosure.

In particular, a method for linear and/or rotary positioning of an object is provided, in which at least two piezoelectric or electrostrictive actuator groups are used, a first actuator group of which moves a first runner portion relative to a stationary base of the drive means according to the principle of an inertia drive, and a second actuator group of which moves a second runner portion relative to the first runner portion with a limited range of movement in the high-resolution scan mode, wherein a common electrical control signal is applied to the first and second actuator groups.

Within the scope of the disclosure, a drive means for positioning an object is proposed, in which two actuator groups (each comprising one or more actuators) are used. A first group of actuators works according to the classical technology of an inertia drive (or the technology of a multi-actuator drive) in order to drive a runner relative to a stationary base by alternatingly bringing friction surfaces that are in friction contact into static and sliding friction by means of this actuator group. A second actuator group which preferably has a larger working range than the first actuator group is integrated into the runner to be moved in this manner. A portion of the runner can thus be moved relative to the portion of the runner which is driven by the first actuator group, by the second actuator group being slowly deflected by applying a gradually changing voltage. This allows a large scanning range (fine positioning range) without having to make the actuator of the original inertia drive larger and without having to increase its stroke by means of levers (although an (additional) increase in stroke may be provided by means of a lever in connection with the second actuator group). The first and second actuator groups are supplied with a common electrical control signal, with which the movement of the runner in the manner of an inertia drive is produced by means of the first actuator group as soon as the control signal has an appropriate sawtooth voltage with a sufficiently steep edge so that slipping of the friction surfaces occurs. If no appropriate sawtooth voltage is applied to the actuator groups, the friction surfaces remain in static friction and the two actuator groups follow the profile of the variable voltage that is applied. The drive means provides a much greater scanning range than a corresponding inertia drive or a corresponding multi-actuator drive.

In a variant of the above, the second actuator group, i.e., the actuator group that implements the scanning movement, is integrated into the stationary base and the first actuator group is arranged inside the runner, so that the second portion of the runner is moved relative to the first portion of the runner according to the principle of an inertia drive or multi-actuator drive, depending on whether an inertia drive or a multi-actuator drive is integrated into the runner.

In an advantageous embodiment of one aspect of the disclosure, the actuator group which is designed for movement in the manner of an inertia drive is provided with a high-pass filter for partial or full suppression of the semi-static scan signal portion, and/or the coupling actuator group is provided with a low-pass filter for partial or full suppression of the inertia drive signal portion.

In one embodiment, the voltage signal from the control means which is supplied electrically to the one actuator group passes through an electrical low-pass filter, for example in the form of a resistance connected in series, so that the steep edges of the sawtooth signal do not or do not completely reach this actuator group, whereas the other actuator group experiences the steep edges in the voltage and then accelerates to strongly in response that the friction surface slipping occurs that is necessary for the inertia drive.

In another, or supplementary embodiment of the disclosure, an electrical high-pass filter is provided in the power supply for the other actuator group having the control signal from the control means, with the result that this actuator group will experience rapidly changing signal variations, like the steep edges of the sawtooth voltage, for example, but not any slow changes in voltage such as those occurring in scan mode, for example.

In a combined embodiment of the drive means according to the disclosure, an electrical low-pass filter is provided in the control signal supply to the coupling actuator group, for example in the form of a resistance in the electrical line, and an electrical high-pass filter is provided in the supply of the same control signal from the control means to the inertia drive actuator group. As a result, the latter actuator group experiences only the rapidly changing voltage, and the other actuator group experiences only the slowly changing voltage signals.

In another advantageous embodiment of one aspect of the disclosure, the drive means has a first guide means for guiding the runner relative to the base. In another, supplementary or alternative embodiment of this aspect, the drive means has a second guide means for guiding the second portion of the runner relative to the first portion of the runner and/or relative to the base.

In one embodiment of the disclosure, the runner is guided relative to a stationary base so that it is limited in its freely movable degrees of freedom. The guide means can take the form of a sliding bearing, a rolling bearing, a magnetic bearing, an air bearing and/or flexure joints. Alternatively or additionally thereto, the second portion of the runner, which is moved relative to the first portion of the runner by the second actuator group, is guided relative to the first portion of the runner, whereby the guide means can take the form of a flexure joint, an air bearing, a magnetic bearing, a rolling bearing or a sliding bearing, for example. When using a flexure joint, in particular, it is possible to realize high-resolution movements by means of the second actuator group without the guidance of the movement obstructing or complicating the achievement of a high resolution. Alternatively or additionally, the second portion of the runner, which is moved relative to the first portion of the runner by the second actuator group, may be guided relative to the stationary base of the drive means, whereby the guide means can take the form of a flexure joint, an air bearing, a magnetic bearing, a rolling bearing or a sliding bearing, for example, which has the advantage that the drive means is robust against mechanical stress, particularly when using a mechanical guide means such as a rolling bearing.

In another advantageous embodiment of one aspect of the disclosure, the drive means is equipped with a multi-actuator drive for moving the first portion or the second portion of the runner, wherein the actuator group designed for movement in the manner of an inertia drive is part of the multi-actuator drive.

In such an embodiment, the runner is driven by a multi-actuator drive, and at least one of the actuator groups of the multi-actuator drive is supplied with a common control signal shared with the coupling actuator group.

In another advantageous embodiment of one aspect of the disclosure, the drive means comprises a position sensor for determining a position or movement of the second portion of the runner relative to the base.

The movement of the second portion of the runner according to the disclosure can be measured by using displacement sensors. In that regard, sensors may be used that are integrated into the stationary base of the drive means, for example, and which measure the movement of the runner, preferably the second portion of the runner. Typical sensors for this purpose include, for example, optical, inductive, magnetic and capacitive encoders, resistance sensors, draw-wire sensors, etc. Highly compact laser interferometers, as described in DE 10 2015 201 754, can likewise be integrated into the drive means. As an alternative to the integrated sensors, sensors can also be arranged outside the drive means, from where they measure the movement of the second portion of the runner relative to the base of the drive means. Typical sensors for this purpose include, for example, laser triangulation sensors, laser interferometers and confocal displacement sensors.

In a further advantageous embodiment of one aspect according to the disclosure, a lever mechanism for transmitting a stroke movement of the coupling actuator group is provided.

The stroke of the actuator group is transferred in enlarged form to the coupled portion of the runner via a lever device. This allows a larger fine positioning range, without having to enlarge the entire drive means or actuator group accordingly.

Preferred and advantageous embodiments of the disclosure are defined in the dependent claims, in particular. It should be understood in that regard that an embodiment which is described in connection with a method according to the disclosure should also be understood as an embodiment of an apparatus according to the disclosure, and vice versa.

BRIEF DESCRIPTION OF THE SEVERAL VIEWS OF THE DRAWINGS

In the following, the disclosure shall be described in greater detail with reference to preferred embodiments and to the enclosed Figures, in which.

DETAILED DESCRIPTION

FIG. 1 shows a schematic sketch of a prior art inertia drive with typical sawtooth control.

In a prior art inertia drive, an actuator D is provided to which a periodic, sawtooth-like signal is applied, and which produces an acceleration relative to a displaceably mounted runner E which is frictionally connected to the actuator. Actuator D contracts on the falling edge of the actuator signal, but due to the inertia of runner E, the latter does not follow this retraction of actuator D, thus resulting in a relative displacement between actuator D and runner E.

Multi-actuator drives, so called, can easily be created by using several such drives in parallel with one another.

Figure 2:
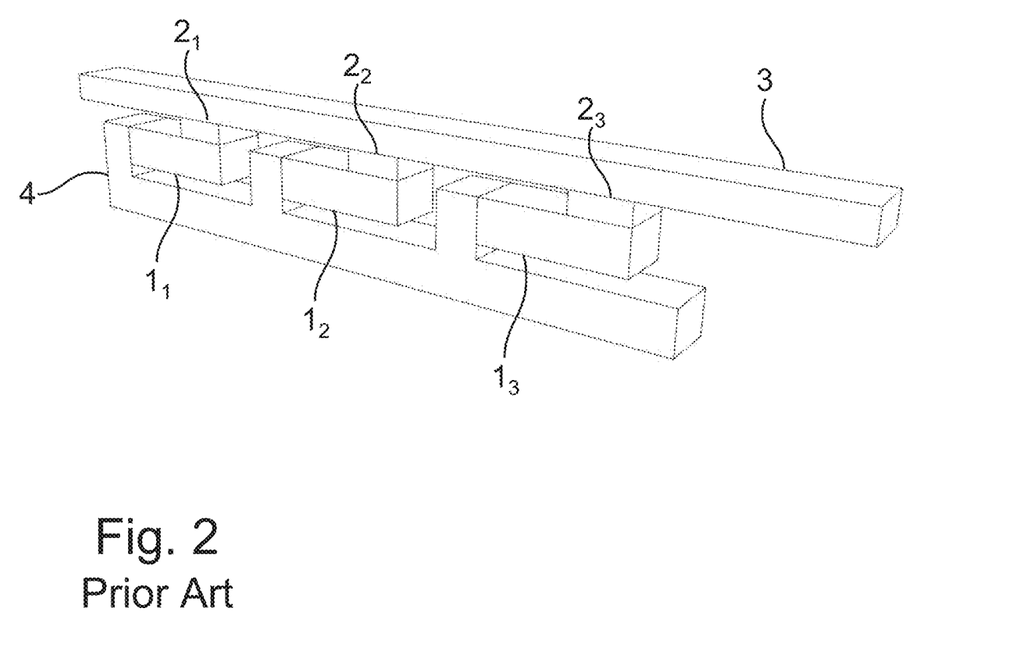
FIG. 2 shows a schematic illustration of a prior art multi-actuator drive.

FIG. 2 shows a schematic illustration of a prior art multi-actuator drive.

A prior art multi-actuator drive has a plurality of actuators. Three actuators $1_1$, $1_2$, $1_3$ are provided in this case, but the multi-actuator drive can basically have any number of actuators, each of which can be excited individually or in groups by means of a control signal to perform a limited stroke (generally up to a few microns in the case of piezo actuators). The actuators each have a point of friction $2_1$, $2_2$, $2_3$ 2 which is in frictional contact with a runner 3. Each of the actuators is in constant contact with a base 4.

FIG. 3 shows a schematic view of control signals for a prior art multi-actuator drive as shown in FIG. 2, and the resulting movement. FIG. 3 shows typical voltage curves a, b, c over time for controlling the three actuators, with control based in each case on a time-shifted sawtooth waveform. For the runner, this results in the typical movement d shown in FIG. 3.

Figure 4:
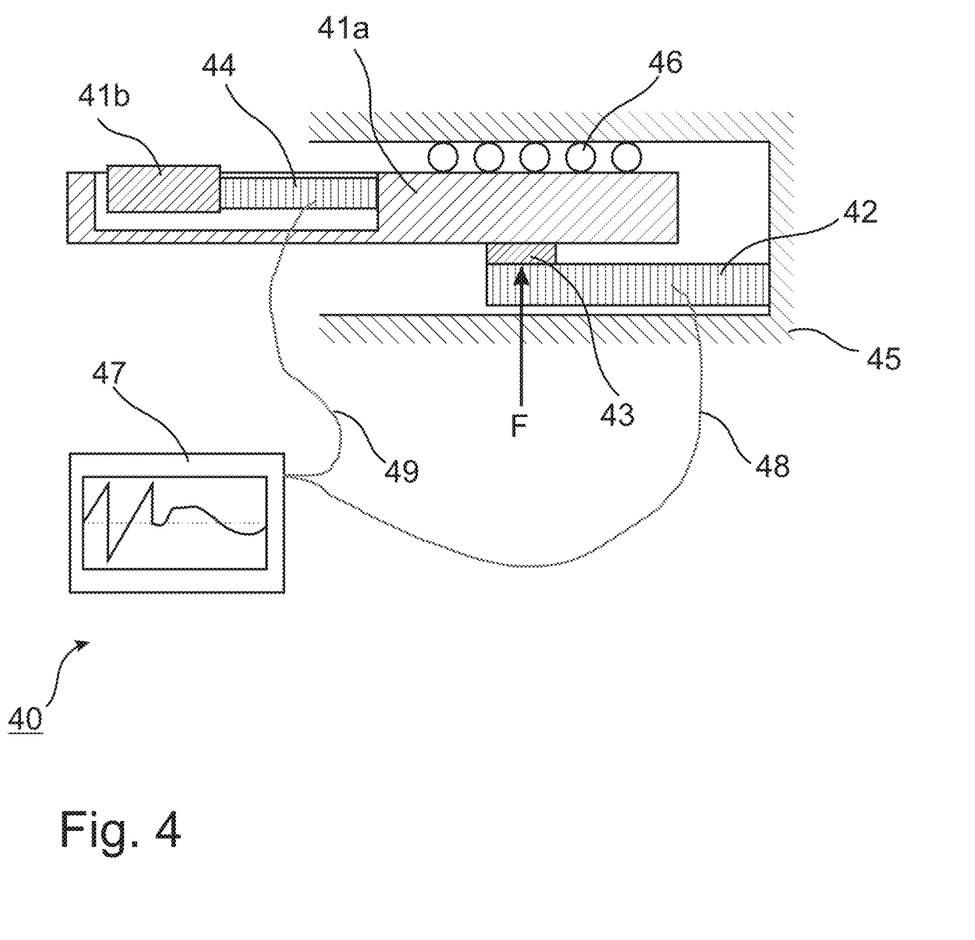
FIG. 4 shows a schematic view of a first embodiment of a drive means according to the disclosure.

FIG. 4 shows a schematic view of a first embodiment of a drive means according to the disclosure.

The drive means (or device) 40 according to the first embodiment comprises a first portion 41a of the runner according to the principle of an inertia drive, and an actuator group 42 which is in frictional contact with the first portion 41a of the runner via a friction surface 43. The friction surface is pressed against the first portion 41a of the runner by a force F. It is advantageous, although not essential, if the first portion of the rotor 41a is guided relative to a stationary base 45, whereby a ball bearing 46 is shown in the figure. A second portion 41b of the runner is in contact with a second actuator group 44 which is in contact at its opposite end with the first portion 41a of the runner. In this embodiment, the second actuator group 44 has a longer stroke than the first actuator group 42, although this is only advantageous, but not essential (the stroke lengths can also be the same, and the stroke of the second actuator group 44 can also be smaller than that of the first actuator group). The second portion 41b of the runner can be moved relative to the first portion 41a of the runner by means of the second actuator group 44, the path travelled being limited to the stroke of the second actuator group 44. Actuator groups 42 and 44 are supplied by control means 47 with a common control signal which is supplied via electrical lines 48 and 49 to actuator groups 42 and 44.

Even though a linear drive device is shown in FIG. 4, the principle can also be used in this way for rotary drive devices.

If there is a plurality of parallel actuator groups or drives in the base, control can also be performed to operate a multi-actuator drive, analogously to the description above (FIG. 2 and FIG. 3).

Figure 5:
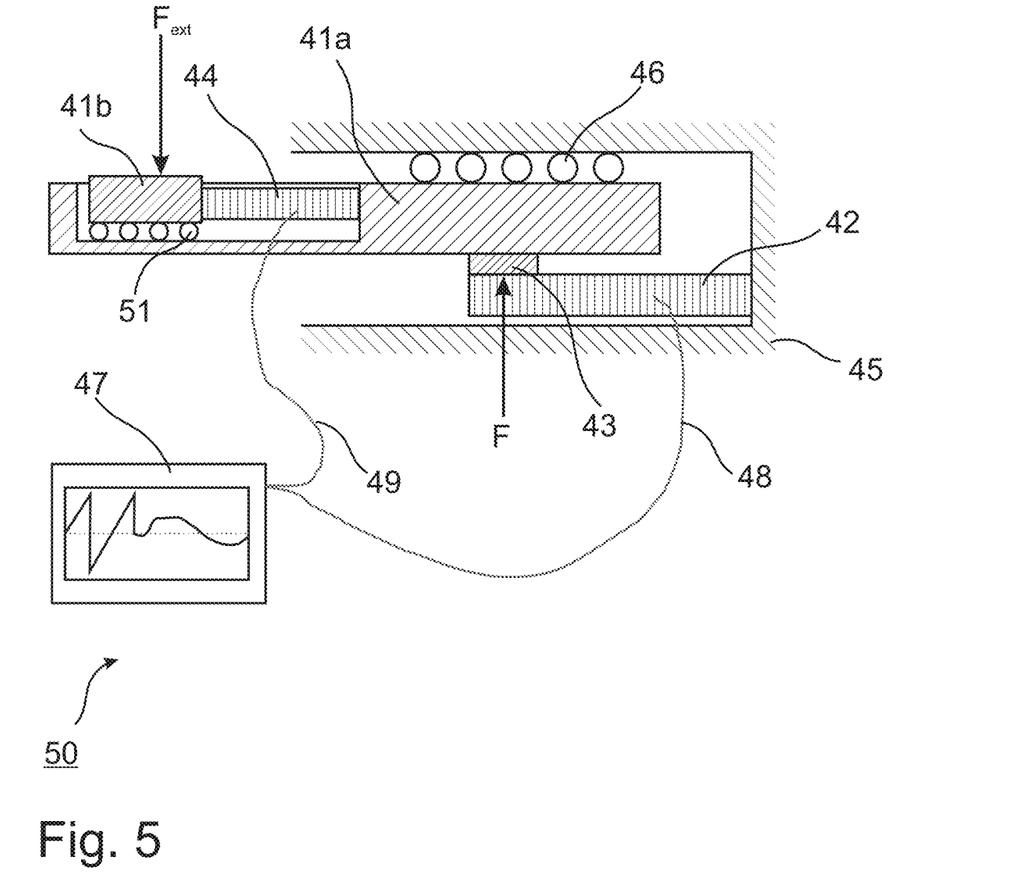
FIG. 5 shows a schematic view of a second embodiment of a drive means according to the disclosure.

FIG. 5 shows a schematic view of a second embodiment of a drive means (or device) 50 according to the disclosure. This embodiment is almost identical to the first embodiment, with the difference that the second portion 41b of the runner is guided relative to the first portion 41a of the runner. In FIG. 5 this guide means (or system) 51 is shown as a rolling bearing. This has the advantage that external forces $F_{ext}$ acting on the second portion 41b of the runner do not exert a load on the second actuator group 44, as these forces are absorbed by guide means 51.

Figure 6:
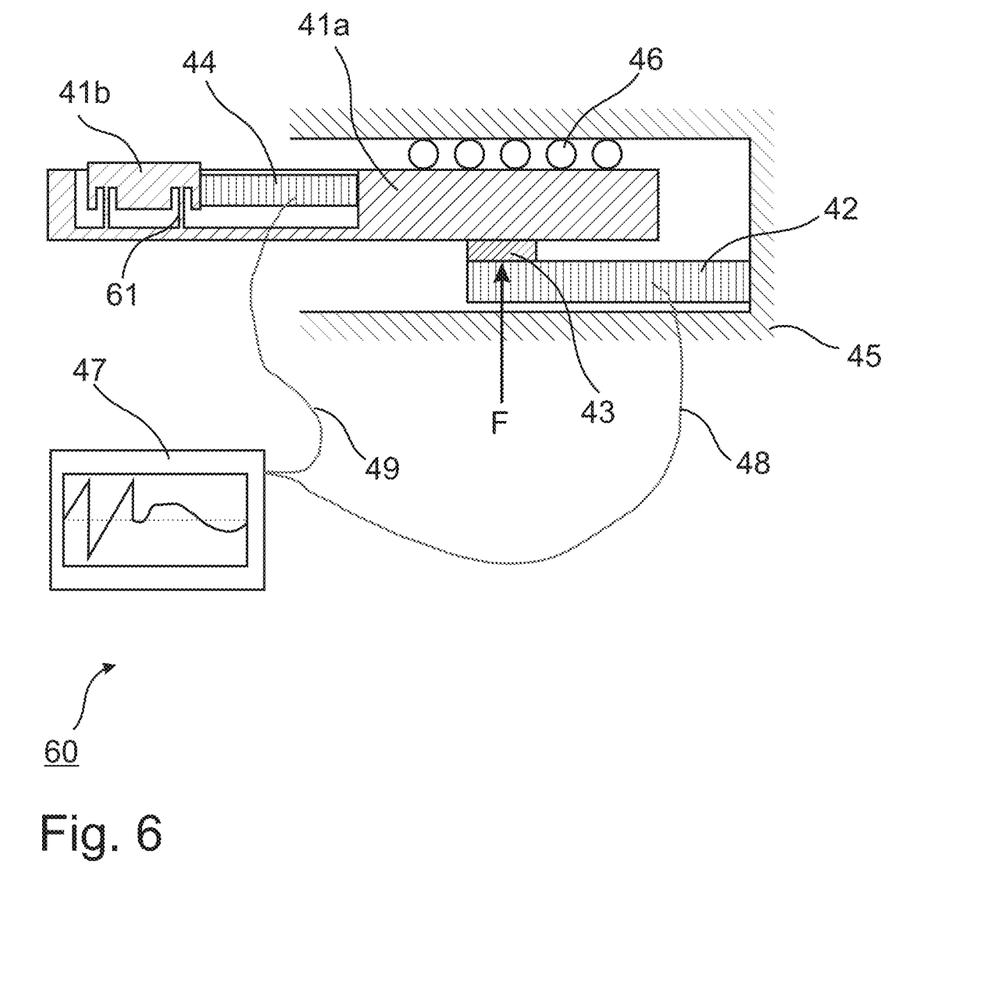
FIG. 6 shows a schematic view of a third embodiment of a drive means according to the disclosure.

FIG. 6 shows a schematic view of a third embodiment of a drive means (or device) 60 according to the disclosure. This embodiment is again almost identical to the second embodiment, with the difference that the guide means is provided in the form of a flexure joint 61 between the first portion 41a of the runner and the second portion 41b of the runner. This has the advantage that the motion of actuator group 44 can be transferred undisturbed to the second part 41b of the runner, which means that particularly high-resolution movement can be achieved. If solid bodies are used, it is particularly easy to provide the first and second portions of the runner (41a and 41b) in one piece, which simplifies production.

Figure 7:
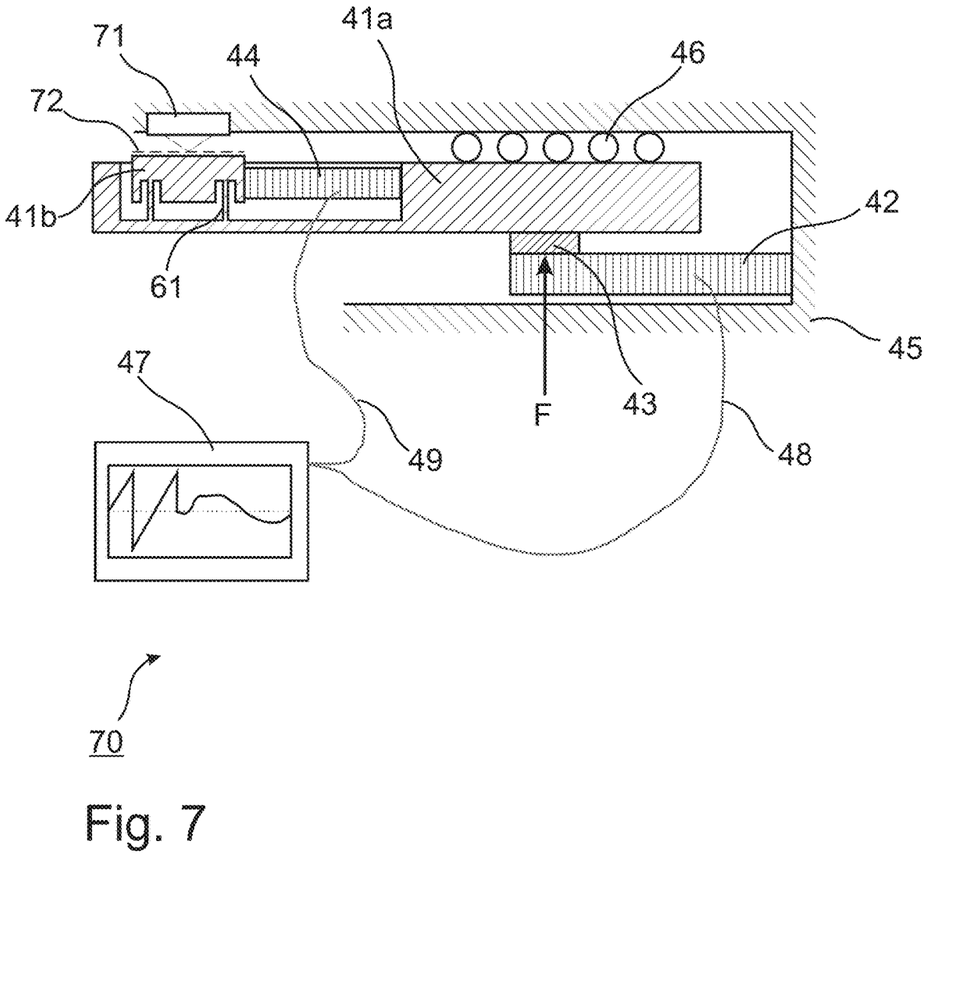
FIG. 7 shows a schematic view of a fourth embodiment of a drive means according to the disclosure.

FIG. 7 shows a schematic view of a fourth embodiment of a drive means (or device) 70 according to the disclosure. This embodiment is again almost identical to the third embodiment, with the difference that a sensor 71 which can measure the movement of the second portion 41b of the runner, for example by reading a ruler 72, is integrated into base 45. Depending on the kind of sensor that is used, an additional medium for detecting the position, such as ruler 72, may not be necessary. For example, an interferometer may be able to detect directly the positional displacement of the second portion of the runner.

It should be noted that the fourth embodiment can also be modified, in relation to the third embodiment, according to the first or second embodiment.

Figure 8:
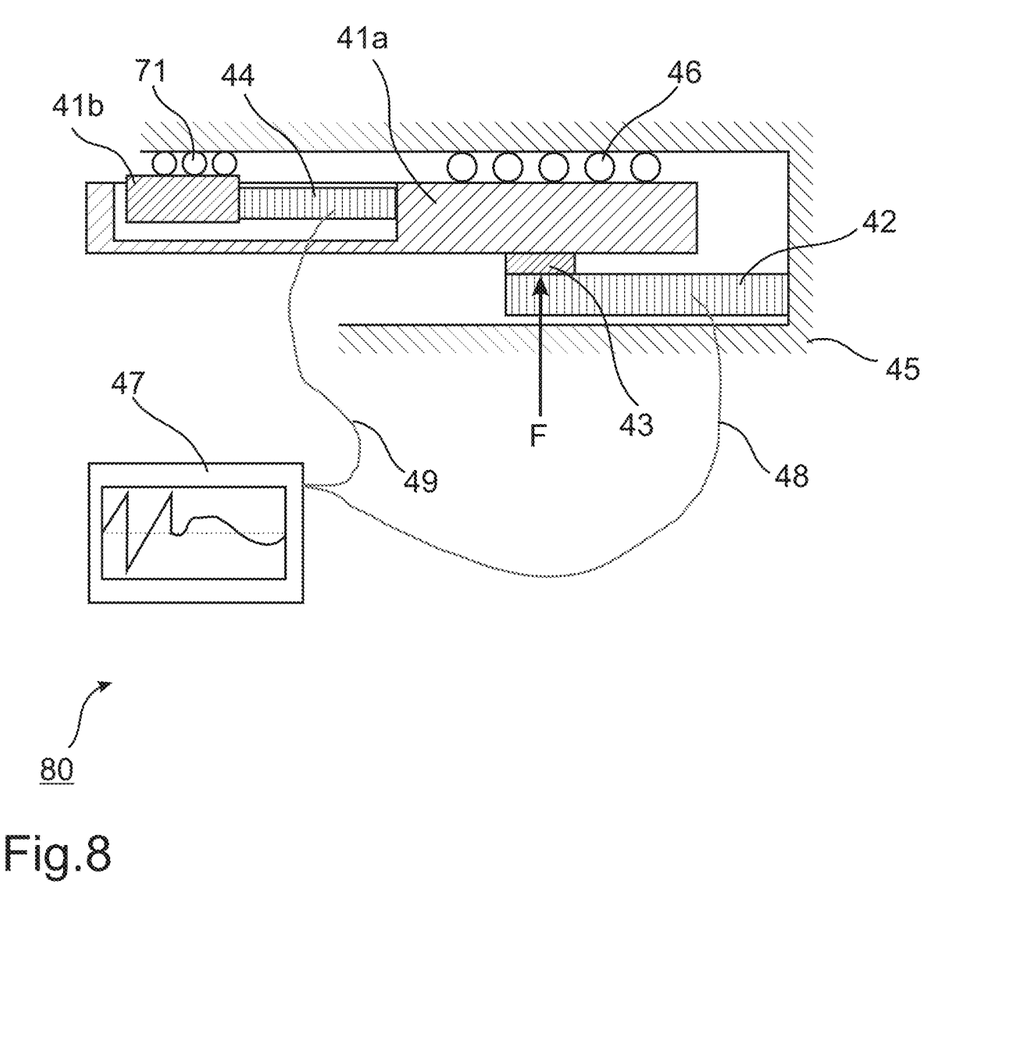
FIG. 8 shows a schematic view of a fifth embodiment of a drive means according to the disclosure.

FIG. 8 shows a schematic view of a fifth embodiment of a drive means 80 according to the disclosure. This embodiment is almost identical to the first embodiment, with the difference that the second portion 41b of the runner is mounted relative to base 45, the guide means 71 being shown in FIG. 8 in the form of a rolling bearing, although of course any other known kind of guide means may be used. If the second portion 41b of the runner is guided by a bearing 71, then the first portion 41a of the runner does not necessarily have to be mounted relative to base 45 as well, as shown by the roller guide 46 means in FIG. 8.

Figure 9:
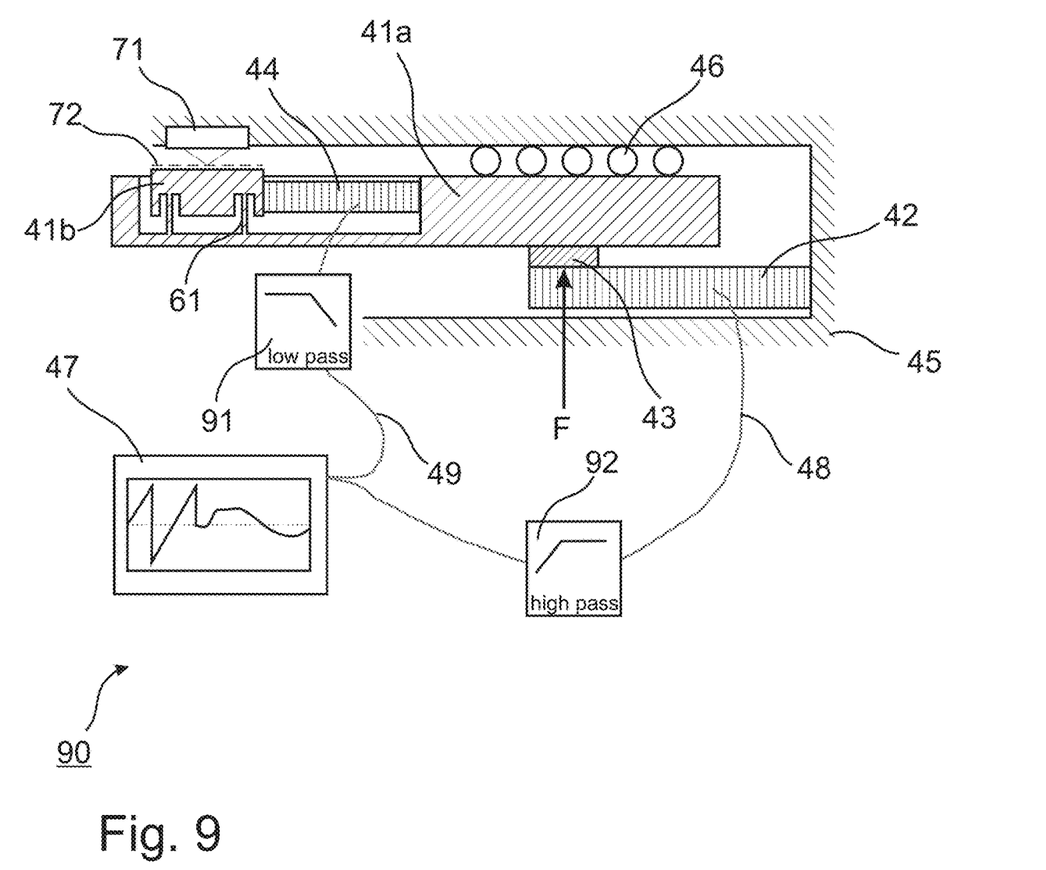
FIG. 9 shows a schematic view of a sixth, preferred embodiment of a drive means according to the disclosure.

FIG. 9 shows a schematic view of a sixth, preferred embodiment of a drive means (or device) 90 according to the disclosure. This embodiment has similarities with the fourth embodiment, with the difference that a low-pass filter 91 and a high-pass filter 92 are provided in the electrical lines 48, 49 to actuator groups 42, 44. The effect of the high-pass filter 92 in line 48 leading to the first actuator group 42 is that slowly changing voltage levels outputted by control means (or controller) 47 do not or do not completely reach the first actuator group 42, so this actuator group does not perform a respective movement and therefore does not entrain the first portion 41a of the runner, either, when there are slowly varying signals. However, fast-changing signals are passed to the first actuator group 42, so this actuator group can drive the runner (41a+41b) according to the principle of an inertia drive, high-pass filter 92 being set in such a way that the slow edges of the sawtooth voltage signal preferably being used are not filtered out. The effect of the low-pass filter 91 in line 49 to the second actuator group 44 is that fast-changing signals do not pass through to actuator group 44. Thus, the steep edges of the sawtooth voltage signal preferably being used, which are used for macroscopic movement of the first portion 41a of the runner 41a, do not reach the second actuator group 44. With an advantageously adjusted low-pass filter 91, actuator group 44 is not reached by the slow edges of the sawtooth signal, either, but only by voltages that change even more slowly. A corresponding drive means 90 can operate macroscopically according to the principle of an inertia drive when the driver is supplied with a sawtooth voltage, and it has a very large fine positioning range (scanning range) when the changes in voltage are correspondingly slow. It is not necessary to use both high- and low-pass filters. For example, a suitable drive means is already very usable when only the low-pass filter 91 is used. In that case, actuator group 42 supports the fine positioning range of actuator group 44. This can be advantageous, but can also have disadvantages, for example if guide means 46 introduces interference.

It is clear that the above statements concerning the high-pass filter and/or the low-pass filter can also be applied accordingly to the other embodiments if the respective elements are likewise provided there.

Figure 10:
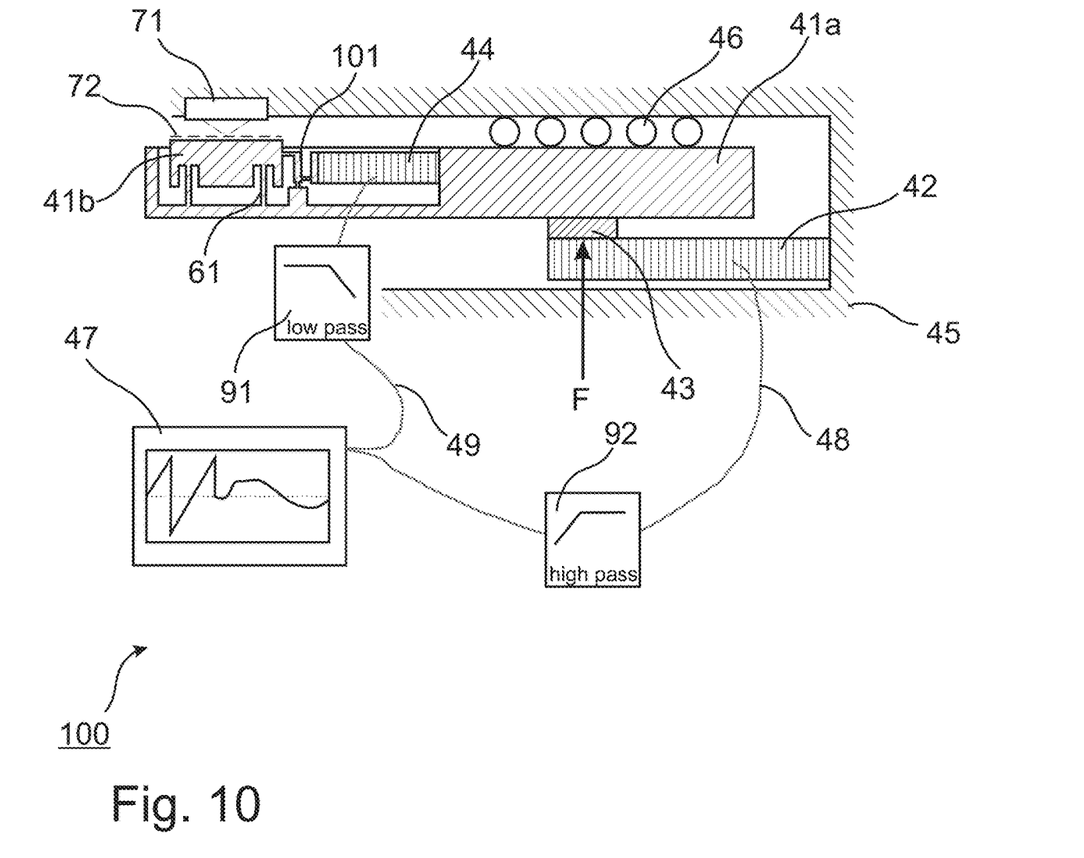
FIG. 10 shows a schematic view of a seventh embodiment of a drive means according to the disclosure.

FIG. 10 shows a schematic view of a seventh embodiment of a drive means (or device) 100 according to the disclosure. This embodiment is almost identical to the sixth embodiment, but the stroke of the second actuator group 44 is transferred in enlarged form to the second portion 41b of the runner via a lever device 101. This can be advantageous, especially when a large fine positioning range is needed, but the entire drive means is to be built small, with the result that a large actuator group 44 cannot be integrated into drive means 100.

Figure 11:
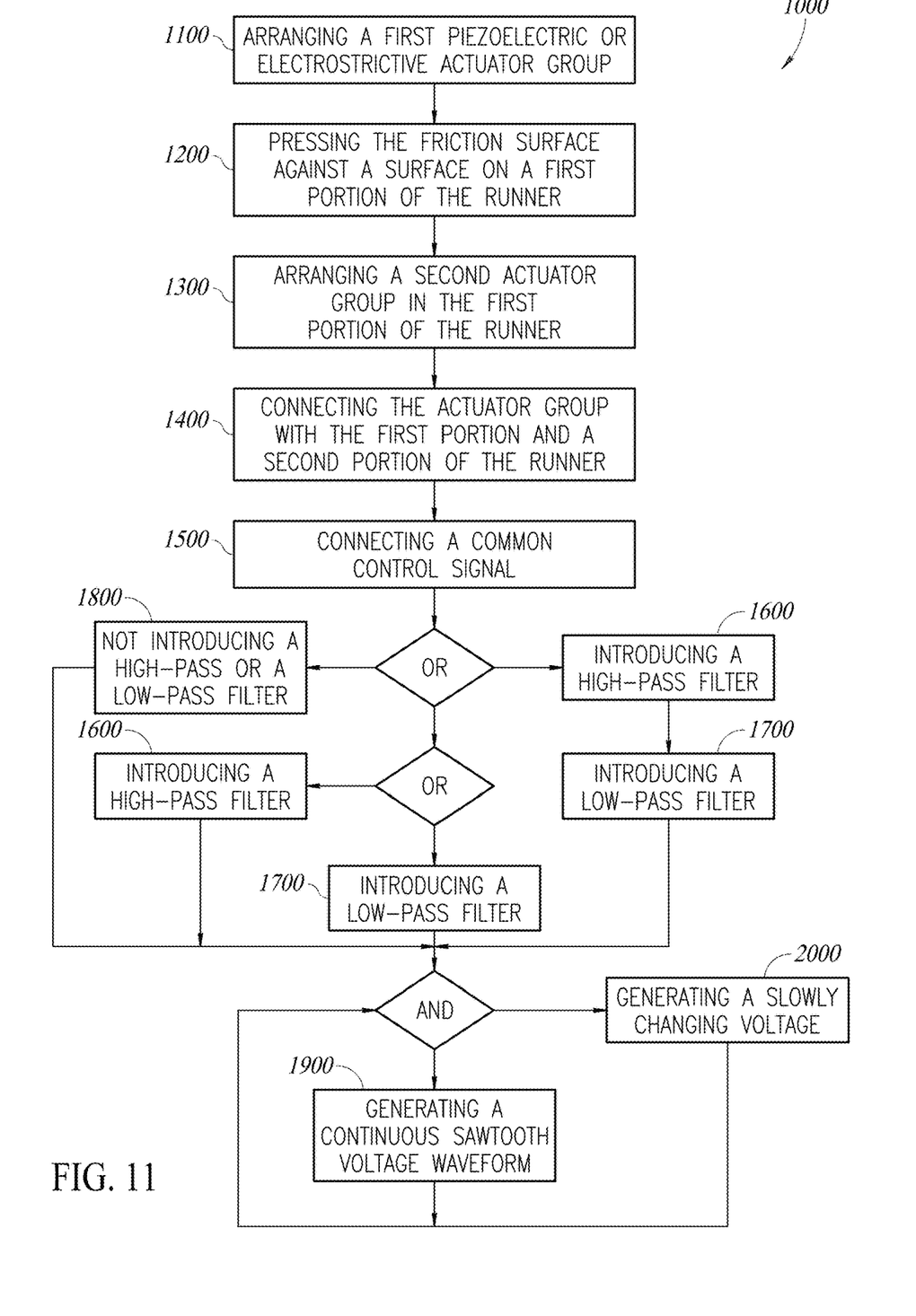
FIG. 11 shows a schematic flow diagram of an embodiment of a drive method according to the disclosure.

FIG. 11 shows a schematic flow diagram of an embodiment of a drive method according to the disclosure.

The non-resonant drive method 1000 comprises the steps of:

arranging 1100, in a stationary base, a first piezoelectric or electrostrictive actuator group having a friction surface;

pressing 1200 the friction surface against a surface on a first portion of the runner, such that said surfaces are in friction contact and such that the first portion of a runner can be driven according to the principle of an inertia drive or a multi-actuator drive by controlling the first actuator group with at least one sawtooth voltage waveform;

arranging 1300 a second actuator group in the first portion of the runner;

connecting 1400 the actuator group with the first and a second portion of the runner which is movable relative to the first portion, such that the two portions can be moved in a targeted manner relative to each other when the second actuator group is deflected;

connecting 1500 a common control signal from a control means with the first and second actuator group;

generating 1900 a continuous sawtooth voltage waveform, or some other signal waveform having alternating flat and steep edges, by means of the control means, in order to move the runner macroscopically according to the principle of an inertia drive until the desired distance has been moved and it is possible to switch to the fine positioning mode; and generating 2000 a slowly changing voltage so as to move the second portion of the runner relative to the first portion of the runner with high resolution in the fine positioning mode in order to reach a setpoint position, then switching to the inertia drive mode when the setpoint position is outside the fine positioning range available.

Connecting 1500 the common control signal can be followed by various alternatives preceding generation 1900, namely introducing 1600 a high-pass filter between the control means and the first actuator group, or introducing 1700 a low-pass filter between the control means and the second actuator group, or introducing 1600 a high-pass filter between the control means and the first actuator group and introducing 1700 a low-pass filter between the control means and the second actuator group, or not introducing 1800 a high-pass or low-pass filter Even if the embodiments discussed above each relate to a linear movement of the object to be driven, the disclosure is not limited to such a linear movement, and rotary movement as well as composite movements and positionings are likewise possible. In the case of rotary movement or positioning, the friction surface is moved tangentially instead of parallel.

It is preferred that the pressing force F is determined by an adjusting spring structure. It is possible that the effective direction of the springs being used is deflected by a mechanical structure.

It is also possible for a plurality of actuators to be used in parallel, so the actuators can be controlled in such a way that a surface to be driven can also be controlled according to the principle of the multi-actuator drive.

In the embodiments, the present disclosure has been described in such a way that the drive device as such is stationary, whereas the object to be moved is moved relative to the base and therefore in absolute terms also. However, it should be understood that the movement between the base and the object is to be understood primarily as the relative movement between these elements. It is also possible that the movement between the object and the base is manifested as an absolute movement of the drive means, in which case the object then remains stationary in absolute terms. It is also possible that the relative movement results in a respective absolute movement of both the base and the object (in opposite directions).

Even if different aspects or features of the disclosure are shown in combination in the Figures, it is clear to a person skilled in the art, unless otherwise specified, that the combinations shown and discussed are not the only ones possible. More particularly, it is possible to swap corresponding units or groups of features from different embodiments.

According to one embodiment of the present disclosure, a drive means for non-resonant linear and/or rotary positioning of an object is provided, comprising at least two piezoelectric or electrostrictive actuator groups each consisting of at least one actuator, wherein a first actuator group moves a first runner relative to a stationary base of the drive means according to the principle of an inertia drive, by alternatingly bringing friction surfaces that are pressed together into static and sliding friction by means of this actuator group, and wherein a second portion of the runner is moved relative to the first runner portion driven by the first actuator group with a limited range of movement in the fine positioning mode (scan mode) by means of the second actuator group, wherein the first and second actuator groups are supplied with a common electrical control signal, with which the movement of the runner according to the principle of an inertia drive is produced by means of the first actuator group as soon as the control signal has an appropriate sawtooth voltage with flat and steep edges, the steep edge of which accelerates the actuator so strongly that slipping of the friction surfaces in contact with each other occurs, and wherein the control signal has a semi-static or slowly varying voltage during the period in which no sawtooth curve is applied, in order to move at least one actuator group without any slipping of a friction surface occurring.

In particular, an electrical low-pass filter may be provided before or after the second actuator group, for example in the form of an electrical resistance, so that fast-changing signal variations do not reach or only partially reach the second actuator group.

Additionally or alternatively, an electrical high-pass filter may also be provided for the first actuator group, so that slowly changing signal variations do not reach or only partially reach the first actuator group.

The movement of the second portion of the runner relative to the stationary base may be detected by means of a position sensor, which can be either a sensor integrated into the drive means, for example an optical, inductive, magnetic or capacitive encoder or interferometer, or an external sensor such as a laser interferometer.

The runner may be guided relative to the stationary base of the drive means by a guide means, for example a sliding bearing, a rolling bearing, a magnetic bearing, an air bearing or a flexure joint.

The second portion of the runner, which is moved relative to the first portion of the runner by means of the second actuator group, may be guided relative to the first portion of the runner, whereby the guide means can take the form of a flexure joint, an air bearing, a magnetic bearing, a rolling bearing or a sliding bearing, for example.

The second portion of the runner, which is moved relative to the first portion of the runner by the second actuator group, may be guided relative to the stationary base of the drive means, whereby the guide means can take the form of a flexure joint, an air bearing, a magnetic bearing, a rolling bearing or a sliding bearing, for example.

The runner may be driven by a multi-actuator drive, and at least one of the actuator groups of the multi-actuator drive may be supplied with a control signal shared with the second actuator group.

The stroke of the second actuator group may be transferred via a lever such that a movement larger than the stroke of the second actuator group is transferred to the second portion of the runner.

The second actuator group may be arranged in the stationary base of the drive means, and the first actuator group inside the runner, the components of which are moved relative to each other according to the principle of an inertia drive or a multi-actuator drive.

According to one embodiment of the present disclosure, a method for non-resonant linear and/or rotary positioning of an object comprises the steps of arranging, in a stationary base, a first piezoelectric or electrostrictive actuator group having a friction surface, and pressing the friction surface against a surface on a first portion of the runner such that said surfaces are in friction contact and such that the first portion of a runner can be driven according to the principle of an inertia drive or a multi-actuator drive by controlling the first actuator group with at least one sawtooth voltage waveform; arranging a second actuator group in the first portion of the runner and connecting the actuator group to the first and a second portion of the runner which is movable relative to the first portion, such that the two portions can be moved in a targeted manner relative to each other when the second actuator group is deflected; connecting a common control signal from a control means with the first and second actuator group; optionally introducing a high-pass filter between the control means and the first actuator group and optionally introducing a low-pass filter between the control means and the second actuator group; generating a sawtooth voltage waveform, or some other signal waveform having alternating steep and flat edges, by means of the control means, in order to move the runner macroscopically according to the principle of an inertia drive, and generating a slowly changing voltage so as to move the second portion of the runner relative to the first portion of the runner with high resolution in the fine positioning mode.

The invention claimed is:

1. A drive device for non-resonant linear and/or rotary positioning of an object comprising:
   a base;
   a first actuator group having at least one piezoelectric or electrostrictive actuator;
   a second actuator group having at least one piezoelectric or electrostrictive actuator;
   a runner having a first portion and a second portion, the first portion and the second portion being configured to be movable toward one another in at least one direction of movement, wherein the second portion of the runner is the object to be positioned or is coupled to the object to be positioned; and
   a controller coupled to the first and second actuator groups,
   wherein the first actuator group is configured to move the first portion of the runner relative to the base,
   wherein the second actuator group is configured to move the second portion relative to the first portion of the runner along the at least one direction of movement,
   wherein one of the first or second actuator groups is configured for a movement in accordance with an inertia drive and the other one of the first or second actuator groups is configured for direct or indirect coupling as a coupling actuator group, and
   wherein the controller is configured to generate a control signal for the first and second actuator groups, the control signal having at least one inertia drive signal portion comprising sections with different gradients and a semi-static scan signal portion.

2. The drive device according to claim 1, wherein the first actuator group is the one that is configured for movement in accordance with the inertia drive includes a high-pass filter for partial or full suppression of the semi-static scan signal portion.

3. The drive device according to claim 1, comprising a position sensor for determining a position or movement of the second portion of the runner relative to the base.

4. The drive device according to claim 1, comprising a first guide means for guiding the runner relative to the base.

5. The drive device according to claim 4, comprising a second guide means for guiding the second portion of the runner relative to at least one of the first portion of the runner or the base.

6. The drive device according to claim 1, wherein the drive device is equipped with a multi-actuator drive for moving the first portion or the second portion of the runner, wherein the first actuator group is the one configured for movement in accordance with the inertia drive and is part of the multi-actuator drive.

7. The drive device according to claim 1, comprising a lever mechanism for transmitting a stroke of the coupling actuator group.

8. The drive device according to claim 1,
   wherein the first actuator group is configured for movement of the first portion of the runner relative to the base in accordance with the inertia drive, and
   wherein the second actuator group couples the second portion of the runner directly or indirectly with the first portion of the runner.

9. The drive device according to claim 1, wherein the second actuator group includes a low-pass filter for partial or full suppression of the at least one inertia drive signal portion.

10. A method for non-resonant linear and/or rotary positioning of an object, the method comprising:
   moving a first portion of a runner relative to a base using a first actuator group, wherein the first actuator group includes at least one piezoelectric or electrostrictive actuator,
   moving a second portion of the runner relative to the first portion of the runner along a direction of movement using a second actuator group, wherein the second actuator group includes at least one piezoelectric or electrostrictive actuator,
   wherein moving the first portion is performed in accordance with an inertia drive and moving the second portion is performed via a direct or indirect coupling, and
   providing a control signal to the first and second actuator groups, the control signal having at least one inertia drive signal portion comprising sections with different gradients and a semi-static scan signal portion.

11. The method according to claim 10, comprising high-pass filtering of the control signal for the first actuator group which performs the movement in accordance with the inertia drive, for partial or full suppression of the semi-static scan signal portion.

12. The method according to claim 10, comprising low-pass filtering of the control signal for the second actuator group for partial or full suppression of the at least one inertia drive signal portion.

13. The method according to claim 10, comprising determining a position or movement of the second portion of the runner relative to the base.

14. A drive device for non-resonant linear and/or rotary positioning of an object, comprising:
   a base;
   a first actuator group having at least one piezoelectric or electrostrictive actuator; and
   a second actuator group having at least one piezoelectric or electrostrictive actuator; and
   a runner having a first portion and a second portion, the first portion and the second portion being configured to be movable toward one another in at least one direction of movement, wherein the second portion of the runner is the object to be positioned or is coupled to the object to be positioned;
   wherein the first and second actuator groups have a control signal connection configured to receive a control signal having at least one inertia drive signal portion comprising sections with different gradients and a semi-static scan signal portion,
   wherein the first actuator group is configured to move the first portion of the runner relative to the base in response to receiving the control signal,
   wherein the second actuator group is configured to move the second portion relative to the first portion of the runner along the at least one direction of movement in response to receiving the control signal, and
   wherein one of the first or second actuator groups is configured for a movement in accordance with an inertia drive and the other one of the first or second actuator groups is configured for direct or indirect coupling as a coupling actuator group.

15. The drive device according to claim 14, wherein the second actuator group includes a low-pass filter for partial or full suppression of the at least one inertia drive signal portion.

16. The drive device according to claim 14, comprising a position sensor for determining a position or movement of the second portion of the runner relative to the base.

17. The drive device according to claim 14, comprising a first guide means for guiding the runner relative to the base.

18. The drive device according to claim 17, comprising a second guide means for guiding the second portion of the runner relative to at least one of the first portion of the runner or the base.

19. The drive device according to claim 14 wherein the drive device is equipped with a multi-actuator drive for moving the first portion or the second portion of the runner, wherein the first actuator group is the one configured for movement in accordance with the inertia drive and is part of the multi-actuator drive.

20. The drive device according to claim 14, comprising a lever mechanism for transmitting a stroke of the coupling actuator group.

21. The drive device according to claim 14, wherein the first actuator group is the one that is configured for movement in accordance with the inertia drive includes a high-pass filter for partial or full suppression of the semi-static scan signal portion.

22. The drive device according to claim 14, wherein the first actuator group is configured for movement of the first portion of the runner relative to the base in accordance with the inertia drive, and wherein the second actuator group couples the second portion of the runner directly or indirectly with the first portion of the runner.

* * * * *